United States Patent [19]

Biller et al.

[11] 3,886,218
[45] May 27, 1975

[54] PROCESS FOR THE PRODUCTION OF DIHYDROXYDIPHENYLETHERS

[75] Inventors: Efim Biller, Fribourg, Switzerland; Fritz-Peter Schmook, Vienna, Austria; Bernd Haas, Wesseling, Germany

[73] Assignee: Union Rheinische Braunkohlen kraffstoff Aktiengesellschaft, 5047 Wesseling, Germany

[22] Filed: July 19, 1973

[21] Appl. No.: 380,535

[30] Foreign Application Priority Data

Aug. 1, 1972  Germany............................. 2237762

[52] U.S. Cl............................................. 260/613 R
[51] Int. Cl............................................. C07c 41/00
[58] Field of Search ................................. 260/613 R

[56] References Cited
UNITED STATES PATENTS

| | | | |
|---|---|---|---|
| 2,739,171 | 3/1956 | Linn................................ | 260/613 R |
| 3,036,134 | 5/1962 | Mattox............................ | 260/614 R |
| 3,140,252 | 7/1964 | Frillette et al. ............. | 260/614 R X |

Primary Examiner—Bernard Helfin
Attorney, Agent, or Firm—Connolly & Hutz

[57] ABSTRACT

Production of dihydroxydiphenylethers by condensing hydroquinone or alkylhydroquinone in an inert organic solvent in the presence of an aluminum silicate catalyst and recovering the ethers by co-distillation with special solvents, e.g. divinyl benzene.

3 Claims, No Drawings

PROCESS FOR THE PRODUCTION OF DIHYDROXYDIPHENYLETHERS

This invention relates to a process for the production of dihydroxydiphenylethers by condensing dihydric phenols.

It is known that the condensation of hydroquinone for example to form 4,4'-dihydroxydiphenylether can be carried out in the presence of from 95 to 100 % hydrofluoric acid (U.S. Pat. No. 2,739,171). A disadvantage of this process is that the yield of 4,4'-dihydroxydiphenylether amounts to only 14.1 % of the theory. Both Ullmann's method and the hydrolysis of 4,4'-dibromodiphenylether with Cu in $NaOH/H_2O/CH_3OH$ (German Patent 609,080) have the disadvantage that they have to be carried out in two stages i.e. the processes are complicated, and again poor yields.

The present invention provides a process for the production of a dihydroxydiphenylether which comprises reacting a hydroquinone or an alkylhydroquinone having one or two alkyl groups with up to 3 carbon atoms at a temperature of from 50° to 250°C in the presence of a natural or synthetic aluminum silicate in an inert solvent.

Suitable solvents include aromatic or aliphatic hydrocarbons, for example dodecane, mineral oil fractions of a suitable boiling range, xylenes, dibenzylbenzene, diphenylether, dimethyldiphenylether, halogenated aromatic compounds and halogenated diphenylethers or mixtures thereof.

The catalyst used in the process according to the invention can be a natural or synthetic aluminum silicate, for example clays or fullers earths, montmorillonite or bentonite, optionally containing small quantities of other oxides, for example of iron, magnesium, calcium, sodium, potassium, boron, titanium or zirconium or several such oxides. It can be of advantage to activate the catalyst, for example by treating with hydrochloric or sulphuric acid.

The reaction is carried out at a temperature of from 50° to 250°C, preferably at a temperature of from 150° to 190°C. The amount of catalyst may be between 1 and 70 percent by weight of the hydroquinone used, preferably between 10 and 50 percent by weight, depending upon the strength of the degree of acidity. The catalyst can be recovered after completion of condensation, optionally reactivated and reused. The reaction may be carried out with azeotropic removal of the water formed, possibly by working in known manner in vacuo or, in cases where low-boiling solvents are used, under pressure. Thereafter, the reaction product can be filtered or centrifuged, for example under heat, and the reduction in acid content compensated for by the addition of acid or of fresh catalyst. Following removal of the catalyst, the hydroquinone is removed by codistillation, for example with diphenylether, ditolylmethane, dimethyldiphenylether or products of similar boiling point which distil without decomposing, the melting point of the solution distilling over being lower than the melting point of the hydroquinone. In this manner the fractionation can be carried out really effectively, even without a column. 4,4'-dihydroxydiphenylether and more highly condensed compounds remaining substantially quantitatively in the bottom product. The high-melting 4,4'-dihydroxydiphenylether can be distilled in vacuo undecomposed and without sublimation, in the presence of a special solvent such as divinylbenzene or products of similar boiling point, for example triphenyldiether or suitable mineral oil distillates. In general, it is isolated after crystallysing in a highly pure form. The dihydroxytriphenyldiethers simultaneously formed can also be recovered by vacuum distillation using solvents of suitable boiling point such as, for example, tetraphenyltriether.

The following examples illustrate the invention.

EXAMPLE 1

In a 10-litre multinecked flask equipped with a turbine stirrer, reflux condenser, water separator and thermometer, 2,750 g of hydroquinone, 2,750 g of diphenylether, 1,100 g of a montmorillonite activated with sulphuric acid and 800 ml of xylene as entraining agent were kept at an internal temperature of 180° to 190°C for a period of 4 hours during which nitrogen was introduced into the reaction flask. 240 ml of water were removed by distillation. After pressure filtration under nitrogen at 170°C, the unreacted hydroquinone was removed by vacuum distillation at 160°C/60 mm Hg (head temperature), approximately 10 litres of diphenylether being continuously added 7.5 mol of hydroquinone were recovered. Thereafter dibenzylbenzene was added and the last traces of hydroquinone, in addition to a small quantity of the dihydroxydiphenylether, removed in an intermediate fraction at 160°C/60 mm Hg to 210°C/10 Hg. Distillation was then contained at 220° to 250°C/10 mm Hg. After filtration and washing with cyclohexane, 1050 g of 4,4'-dihydroxydiphenylether was obtained (yield 59.5 percent, purity 99 percent). In order further to increase purity, the product can be recrystallised preferably from xylene (optionally under a nitrogen excess pressure to increase solubility) in two to three times the quantity of solvent, resulting in the formation of a white, more than 99.5 percent pure product. About half the residue (a total of 15 percent by weight of the quantity of hydroquinone used) consisted of dihydroxytriphenyldiether, the rest being more heavily condensed oligophenylethers. By adapting the reaction conditions, it was possible to obtain an equally good result with only 20 percent of catalyst, based on the hydroquinone used.

EXAMPLE 2

150 g of hydroquinone were heated with vigorous stirring for 8 hours to 180°C with 60 g of montmorillonite activated with hydrochloric acid in a flask into which nitrogen was introduced. The water formed was removed with an stream of inert gas through a distillation bridge. 91.5 g of unreacted hydroquinone were recovered by subsequent distillation at 160° to 190°C/20 to 30 mm Hg in the presence of 300 ml of dimethyldiphenylether as entraining agent. After addition of divinylbenzene 33 g of 4,4'-dihydroxydiphenylether were obtained by distillation at 220° to 250°C/10 mm Hg, yield 61 %.

EXAMPLE 3

The procedure was as in Example 1, except that the solvents, reaction times and reaction temperatures were different. The results are set out in the following Table:

| Solvent | Reaction temperature °C | Reaction time hours | Yield % |
| --- | --- | --- | --- |
| Cumene | 150 – 155 | 8 | 54 |
| Pseudocumene | 170 – 175 | 5 | 61 |
| o-dichlorobenzene | 178 – 182 | 5 | 56 |
| 1,2,4,-trichlorobenzene/xylene (2:1) | 175 | 4 | 59 |
| Ditolylmethane/xylene (2.5:1) | 185 | 5 | 53 |
| Dibenzylbenzene/xylene (2.5:1) | 185 | 5 | 60 |

EXAMPLE 4

In an apparatus of the kind described in Example 1, 0.5 mol of hydroquinone were boiled under reflux for 5 hours at 182°C with 22 g of fullers earth, 55 g of diphenylether and 18 ml of xylene. During working up by distillation in accordance with Example 1 in the presence of diphenylether and dibenzylbenzene, it was possible to recover 25.3 g of hydroquinone, and 16.1 g of 4,4'-dihydroxydiphenylether (yield 59 percent).

EXAMPLE 5

124 g of 2-methylhydroquinone were heated under reflux for 2.5 hours at 185°C with 186 g of dibenzylbenzene, 44 g of bentonite and 100 ml of xylene. After dilution with ether, the product obtained was filtered, concentrated and 450 ml of dimethyldiphenyl ether added to it. 77g unreacted 2-methylhydroquinone distilled over at a temperature of 150° to 183°C/20 to 30 mm Hg. 700 ml of dibenzylbenzene were then added to the bottom product and 500 ml of distillate removed at a temperature of 230° to 245°C/10 mm Hg. The isomeric dimethyldihydroxydiphenylethers were precipitated with petroleum ether (60° to 80°C). It was possible in this way to obtain 22.2 g of a mixture of the 3 isomeric dimethyldihydroxydiphenylethers, corresponding to a yield of 51 percent. The distillation residue still contained 6.2 g of substances precipitable with petroleum ether. 41 percent consisted of dimethyldihydroxydiphenylethers and the rest of more highly condensed products.

EXAMPLE 6

138 g of 2,6-dimethyl hydroquinone were boiled under reflux for 4.5 hours at 190° to 193°C with 207 g of dibenzylbenzene, 50 g of a synthetic aluminum silicate and 80 ml of xylene. After dilution with methanol, the product was filtered, concentrated, 700 ml of dimethyldiphenylether added to it, followed by distillation. 109 g of starting product crystallised out in the cooled distillate. Following the addition of 800 ml of dibenzylbenzene to the bottom product and the removal of 500 ml of distillate, it was possible by precipitation with petroleum ether (60° to 80°C) to recover 13.3 g of tetramethyldihydroxydiphenylether, i.e. 49 percent of the theoretical. According to analysis by gas chromatography, the product consisted of 3 isomers.

EXAMPLE 7

0.5 mol of hydroquinone were heated under reflux for 2 hours at 182° to 184°C with 55.1 g of diphenylether, 18 ml of xylene and 22 g of montmorillonite activated with benzene sulphonic acid. Working up by distillation in accordance with Example 1 in the presence of diphenylether and dibenzylbenzene gave 20.3 g of unreacted hydroquinone and 19.1 g of 4,4'-dihydroxydiphenylether, yield 60 percent. Corresponding results were obtained over a 5-hour reaction period when montmorillonites activated with methane sulphonic acid or 1,3-benzene disulphonic acid were used as catalysts.

What we claim is:

1. A process for the production of dihydroxydiphenylether, which comprises reacting a hydroquinone or an alkylhydroquinone having one or two alkyl groups with up to 3 carbon atoms at temperatures of from 50° to 250°C in the presence of a natural or synthetic aluminum silicate as catalyst in an inert solvent or a mixtures of solvents selected from the group consisting of dodecane, lower alkyl benzenes, chloro benzenes, diphenylethers, hydrocarbons having 2 or 3 phenyl groups combined with at least 2 methyl or methylene groups and mineral oil fractions of a corresponding boiling range, separating the catalyst from the reaction product, removing the unreacted hydroquinone by co-distillation with the said solvent and recovering the 4,4'-dihydroxydiphenylether by vacuum distillation of the remaining bottom product in the presence of a solvent selected from the group consisting of divinylbenzene, triphenyldiether and mineral oil fractions of a corresponding boiling range, and separating the crystallised ether from the distillate.

2. A process as claimed in claim 1 wherein acidactivated montmorillonite or bentonite is used as the catalyst.

3. A process as claimed in claim 1 wherein the water of reaction is removed by azeotropic distillation with the solvent.

* * * * *